United States Patent
Schuler

(10) Patent No.: US 12,034,291 B2
(45) Date of Patent: Jul. 9, 2024

(54) ACTUATING APPARATUS FOR TRIGGERING AT LEAST ONE PYROFUSE, AND ENERGY STORAGE DEVICE COMPRISING A PYROFUSE OF THIS KIND

(71) Applicant: Liebherr-Components Biberach GmbH, Biberach an der Riss (DE)

(72) Inventor: Michael Schuler, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 388 days.

(21) Appl. No.: 17/305,997

(22) Filed: Jul. 19, 2021

(65) Prior Publication Data
US 2021/0344186 A1    Nov. 4, 2021

Related U.S. Application Data

(63) Continuation of application No. PCT/EP2020/050430, filed on Jan. 9, 2020.

(51) Int. Cl.
H02H 3/04 (2006.01)
H01H 39/00 (2006.01)
H02H 3/08 (2006.01)

(52) U.S. Cl.
CPC .......... *H02H 3/046* (2013.01); *H01H 39/00* (2013.01); *H02H 3/044* (2013.01); *H02H 3/08* (2013.01)

(58) Field of Classification Search
CPC .......... H02H 3/046; H02H 3/044; H02H 3/08; H01H 39/00
See application file for complete search history.

(56) References Cited

U.S. PATENT DOCUMENTS

| | | | | |
|---|---|---|---|---|
| 4,383,515 A | * | 5/1983 | Higashiyama | F02D 41/182 123/480 |
| 4,881,174 A | * | 11/1989 | Gimmler | G01R 23/10 702/78 |
| 6,252,655 B1 | * | 6/2001 | Tanaka | G01S 7/489 356/5.01 |
| 6,411,190 B1 | * | 6/2002 | Yamaguchi | H01H 39/00 361/115 |

(Continued)

FOREIGN PATENT DOCUMENTS

| | | |
|---|---|---|
| DE | 102013016093 | 4/2015 |
| DE | 102015226587 | 6/2017 |

(Continued)

*Primary Examiner* — Hoi C Lau

(74) *Attorney, Agent, or Firm* — Levine Bagade Han LLP

(57) ABSTRACT

The present invention relates to an actuating apparatus for triggering at least one pyrofuse, comprising a supply voltage connection for connection to a supply voltage, at least one triggering output for connecting the at least one pyrofuse and applying a triggering current to the pyrofuse, a signal input for receiving a triggering signal which indicates a state which extends the triggering, and at least one actuating circuit, which can be connected to the supply connection, for providing the triggering current at the triggering outlet in accordance with the received triggering signal, wherein said actuating circuit comprises a field-effect transistor stage for connecting the supply voltage through to the triggering output in accordance with the received triggering signal.

23 Claims, 3 Drawing Sheets

(56) References Cited

U.S. PATENT DOCUMENTS

| | | | | |
|---|---|---|---|---|
| 9,250,051 | B1* | 2/2016 | Smith | F42D 1/055 |
| 9,735,724 | B2* | 8/2017 | Schuster | H01M 8/04858 |
| 10,483,902 | B1* | 11/2019 | Sizov | H02P 29/50 |
| 2002/0166471 | A1* | 11/2002 | Goernig | F42B 3/121 |
| | | | | 102/202.5 |
| 2002/0166472 | A1* | 11/2002 | Goernig | F42B 3/121 |
| | | | | 102/202.5 |
| 2002/0178956 | A1* | 12/2002 | Mattes | F42B 3/13 |
| | | | | 102/202.7 |
| 2004/0094059 | A1* | 5/2004 | Tirmizi | F42B 3/103 |
| | | | | 102/202.12 |
| 2010/0282541 | A1* | 11/2010 | Renton | A62B 1/18 |
| | | | | 182/234 |
| 2013/0307327 | A1* | 11/2013 | Auguet | H01M 50/574 |
| | | | | 307/10.1 |
| 2014/0320048 | A1* | 10/2014 | Vrankovic | H02K 11/02 |
| | | | | 318/400.25 |
| 2018/0337606 | A1* | 11/2018 | Ausseresse | H02M 3/33507 |
| 2019/0063891 | A1* | 2/2019 | Rastegar | F42C 11/02 |
| 2019/0123542 | A1* | 4/2019 | Kambham | G01R 31/007 |
| 2019/0190510 | A1* | 6/2019 | Smith | H02H 3/105 |
| 2019/0252385 | A1* | 8/2019 | Yudanov | G11C 11/406 |
| 2021/0344186 | A1* | 11/2021 | Schuler | H02H 3/044 |

FOREIGN PATENT DOCUMENTS

| | | |
|---|---|---|
| DE | 102016107707 | 7/2017 |
| DE | 102016107706 | 10/2017 |
| DE | 102018207247 | 6/2019 |
| EP | 2293345 | 3/2011 |
| WO | WO 2020/148156 | 7/2020 |

* cited by examiner

ACTUATING APPARATUS FOR TRIGGERING AT LEAST ONE PYROFUSE, AND ENERGY STORAGE DEVICE COMPRISING A PYROFUSE OF THIS KIND

CROSS-REFERENCE TO RELATED APPLICATIONS

This application is a continuation of International Patent Application Number PCT/EP2020/050430 filed Jan. 9, 2020, which claims priority to German Patent Application Number DE 10 2019 101 236.8 filed Jan. 17, 2019, both of which are incorporated herein by reference in their entireties.

BACKGROUND

The present invention relates generally to pyrofuses and their triggering. The invention in this context relates, on the one hand, to an actuating apparatus for triggering at least one pyrofuse comprising a supply voltage connection for connection to a supply voltage, a triggering output for connecting the at least one pyrofuse and applying a triggering current to the pyrofuse, a signal input for receiving a triggering signal that indicates a state requiring a triggering, and an actuating circuit that can be connected to the triggering output for providing the triggering current to the triggering outlet in dependence on the received triggering signal, On the other hand, the invention also relates to an energy store having at least one pyrofuse and an actuating apparatus for triggering the pyrofuse.

It is necessary with energy stores that are used in the electrification of larger working machines having a larger performance range that can store or rapidly discharge and store large energy amounts to be able to rapidly intervene on an occurrence of errors or of excessive power densities and to quickly disconnect connection lines or storage modules. Such energy stores can be used, for example, for the electrification of construction machinery such as concrete mixing vehicles, earth-moving machines and mining machines such as surface miners, or cranes such as container bridge cranes, or also lifting devices such as elevators or other passenger conveying systems in which higher energy amounts are cyclically stored and discharged again, with such energy stores having bidirectional power controllers, in particular DC-DC controllers, being able to control the feeding and discharging into and out of a storage block, which storage block can, for example, have one or more capacitors, in particular double layer capacitors, to be able to quickly store and discharge high energy amounts. Such energy stores are known, for example, from the document U.S. Pat. No. 9,735,724 B2.

In a similar manner, lines also have to be quickly disconnected and drive or power electronic components have to be quickly disconnected in mains operated drive systems having power electronics that can, for example, be installed in a switchgear cabinet to avoid damage when errors occur or excess voltages arise.

To achieve a quick disconnection of the components or lines that are at risk in such energy stores, drive devices, and power electronic modules, normal safety fuses can only be used with difficulty since they would not or would not permanently be able to withstand the high currents in normal operation or would not enable a precise, fast triggering with a sufficient sensitivity for a fast disconnection. It is therefore sensible to use pyrofuses. Such pyrofuses are known per se and typically use a pyrotechnical material mixture that mechanically and sustainably interrupts an associated line when ignited. Such pyrofuses can, for example, have a mechanical interruption element that is accelerated in the direction of the line on ignition and so violently interrupt it. A piston closing an ignition chamber in the non-triggered state can, for example, be accelerated by the ignition and can drive an interrupter element that disconnects the line.

Document DE 10 2013 016 093 A1, for example, describes such a pyrofuse, with the generator and the starter motor being disconnected by the pyrofuse in a motor vehicle to prevent an excess voltage of the generator or an unwanted permanent current feed to the starter. Document EP 2 293 345 A2 furthermore describes a similar pyrofuse by which the inverter of a photovoltaic system is to be disconnected from the photovoltaic modules on the occurrence of an excess voltage.

Such pyrofuses can, however, not be triggered very easily. To ignite the pyrotechnical propellant charge, a specific triggering current is required over a sufficiently long period of time so that a reliable triggering takes place. This cannot be achieved very easily if a fast triggering should simultaneously be achieved without any greater time delay. Said problems are intensified again if not only one pyrofuse, but rather a plurality of pyrofuses are to be simultaneously triggered to actually completely protect the components of the energy store or of the device to be protected.

It is therefore the underlying object of the present invention to provide an improved actuating apparatus of the initially named kind and an energy storage device which avoids disadvantages of the prior art and further develops the latter in an advantageous manner. A precise, fast, and reliable triggering of one or also of more pyrofuses should in particular be achieved that can be simply controlled on an occurrence of a specific event.

SUMMARY

In accordance with the invention, said object is achieved by an actuating apparatus in accordance with claim 1 and by an energy store in accordance with claim 18. Preferred embodiments of the invention are the subject of the dependent claims.

It is therefore proposed to ignite the at least one pyrofuse via a supply voltage that can be switched through to the pyrofuse by means of a field effect transistor. In the normal operation of the device in which the pyrofuse should not trigger, the field effect transistor keeps the supply voltage away from the pyrofuse. If, however, an event occurs that requires a triggering of the fuse, the field effect transistor switches the applied supply voltage through to the pyrofuse.

In accordance with the invention, the actuating circuit connectable to the supply voltage connection for the provision of the triggering current comprises a field effect transistor stage for switching the supply voltage through to the triggering output to which the pyrofuse is connectable. Such a field effect transistor stage is very largely switchable without power or in a lossless manner so that a fast triggering is possible without making any special demands on the triggering signal.

Said field effect transistor stage can in particular be a MOSFET stage, for example having a P-channel MOSFET, to switch through the supply voltage on reception of the triggering signal. Such a MOSFET (metal oxide semiconductor field effect transistor) belongs to the generally usable metal insulator semiconductor field effect transistors that are sometimes also called MISFETs. Even though doped polysilicon is today often used as a gate material, the name MOSFET is nevertheless maintained even though the MOSFET designation is no longer correct due to a lack of a metallic gate material.

To be able to provide a sufficiently high gate current to trigger the pyrofuse on the switching through of the field effect transistor stage, the actuating circuit can, in an advantageous further development of the invention, comprise at least one voltage stabilizing capacitor that stabilizes the supply voltage switched through. In this respect, a plurality of voltage stabilizing capacitors connected in parallel or in series can advantageously be used that stabilize the switched-through supply voltage together and ensure the sufficiently high gate current.

The at least one or each voltage stabilizing capacitor can advantageously have a capacitance of at least 1.0 or also more than 1.5 mF.

In order not to put too much strain on the supply voltage on the switching on by the capacitors or the at least one capacitor, the at least one voltage stabilizing capacitor of the actuating circuit can be rechargeable by the supply voltage via a resistor.

The triggering signal in dependence on which the field effect transistor is switched through can generally be of different natures to be able to trigger the pyrofuse in dependence on different events or circumstances, with at least one sensor advantageously being provided to detect the circumstance requiring a triggering or the corresponding event by a sensor.

In this context, a current and/or voltage sensor can be provided in an energy store to detect an excess voltage and/or too high a current that requires a triggering of the fuse. In general, however, other sensors can be considered such as a temperature sensor for detecting an excess temperature or a motion and/or acceleration sensor to detect an unusual movement and/or acceleration that requires a disconnection of the energy store or of individual components.

Said sensor signal can generally be forwarded directly to the field effect transistor as a triggering signal. In a further development of the invention, however, the at least one sensor signal that indicates the circumstance requiring a triggering of the fuse or indicates a corresponding event, can be treated and/or transformed such that a modified triggering signal is generated from the sensor signal and is used for the triggering of the field effect transistor.

The actuating apparatus in particular comprises at least one flip-flop stage, in particular a flip-flop element, to turn the sensor signal that may only be present temporarily and very briefly into a permanent triggering signal that ensures that the field effect transistor stage switches the supply voltage through to the pyrofuse for a sufficiently long time to supply the pyrofuse with the triggering current for a sufficiently long time.

An RS flip-flop can be used as the flip-flop, for example.

The sensor signal converted into a permanent triggering signal by the flip-flop or flip-flop stage does not have to be the sensor signal itself here, but can rather be a signal in turn derived from the sensor signal, for example. If, for example, a specific signal level is monitored and if the fuse is triggered on a reaching or exceeding of a predetermined level, the sensor signal can be supplied to a comparator or comparison device that only emits an optionally very brief signal or a signal pulse when said level is reached or exceeded. The comparator signal can then be forwarded to the input of the flip-flop stage that turns the brief comparator pulse into a permanent continuous signal.

In a further development of the invention, the actuating apparatus can comprise a plurality of actuating circuits or one actuating circuit having a plurality of actuating channels to trigger a plurality of pyrofuses, in particular simultaneously. Said plurality of actuating circuits or the at least one multichannel actuating circuit can in particular be acted on by the same triggering signal at the input side, in particular by the output signal of the aforesaid flip-flop stage. A plurality of pyrofuses can hereby be reliably triggered approximately simultaneously on an occurrence of a specific event.

The plurality of actuating circuits can here each be designed in the previously named manner, can in particular each have a supply voltage input or supply voltage connection to receive the supply voltage at the input side, with a respective field effect transistor stage of said kind then being present to switch the supply voltage through to the triggering output by the respective actuating circuit. One or more voltage stabilizing capacitors can equally each be part of the respective actuating circuit in said manner.

Alternatively to a plurality of separate or individual actuating circuits, a multichannel actuating circuit can also be provided that can have a plurality of actuating channels for triggering a plurality of pyrofuses, with a field effect transistor stage being able to be associated with each of the actuating channels or also with one field effect transistor stage being able to be provided for all the channels. Independently of this, a common voltage stabilizing capacitor or a plurality of separate voltage stabilizing capacitors can be associated with the plurality of actuating channels.

The actuating apparatus can be simply scaled in a modular manner by the provision of a plurality of output stages or a plurality of actuating channels and by their connection to a common triggering signal output to be able to trigger one, two, three, or also more pyrofuses as required.

Said modules of the actuating apparatus can advantageously be provided on a common circuit board or on a common carrier. The evaluation circuit comprising a comparator stage and/or the aforesaid flip-flop stage, on the one hand, and at least one actuating circuit comprising the field effect transistor can in particular be arranged on a common circuit board. Alternatively or additionally, however, it is also possible to form the at least one or a further actuating circuit on a separate circuit board so that additional triggering stages can be added on separate circuit boards or carriers in dependence on requirements and on the number of required pyrofuses.

To be able to provide fast feedback to the controller of the device as soon as the pyrofuse is or was triggered, the triggering apparatus can, in an advantageous further development of the invention, comprise at least one control connection that enables a connection to a higher ranking control apparatus and that enables a signal transmission between the control apparatus and the triggering apparatus. The triggering apparatus can in particular be configured such that a triggering signal is provided at said control connection as soon as the field effect transistor has switched through the supply voltage or the triggering signal for switching through the field effect transistor has been provided. The actuating circuit or an evaluation circuit connected upstream can in particular provide feedback or a triggering signal to the control connection as soon as the flip-flop stage provides the permanent triggering signal.

The triggering signal of the flip-flop stage can be supplied to the control as a feedback signal, for example.

Alternatively or additionally to such a monitoring and/or feedback of the triggering of the at least one pyrofuse, a test stage can be provided in a further development of the invention to check the at least one pyrofuse for its triggering state and/or functional state. A test can be made by such a test stage whether the pyrofuse is still in the untriggered normal operating state or has already triggered.

The at least one pyrofuse can, for example, be tested as to its state on the starting up of the controller and/or the system supply can be tested as to its state.

Said test stage can, for example, apply a test current to the at least one pyrofuse, with an evaluation circuit being able to check whether a voltage drop that is due to the internal resistance of the pyroelement in the fuse occurs at the respective actuating channel to which the test current is applied. If no voltage drop occurs, the evaluation circuit can assume that the pyrofuse has already triggered previously or is not functional.

A test current can in particular be applied successively to individual channels of the pyrofuses by a signal from the actuating apparatus.

Said test current can, for example, be produced or provided by a current source.

The volage drops due to said test at the individual actuating channel current due to the internal resistance of the pyrolement in the fuse respectively connected thereto. If there is no voltage drop, it can be concluded that the respective pyrofuse has already triggered previously.

Said voltages or voltage drops are detected by an evaluation circuit, which can take place, for example, via individual RS flip-flops, and are evaluated, which can be decided, for example, using the state of said RS flip-flops. If, for example, all the RS flip-flops have a high level, it can be concluded that the pyrofuses are in order. If one or all the RS flip-flops have a low level, it can be concluded that one or all the pyrofuses are no longer in order.

If a voltage is returned from all channels, it can be concluded that the system is in order. If, however, no voltage is returned, it can be concluded that the at least one or more pyrofuses have already triggered.

The result of the test run can be fed back to the control via a signal.

Depending on the design of the device at which the pyrofuse is used, the pyrofuse can be provided at different sites to disconnect device components requiring protection. If an energy store having a power controller for converting or controlling the current to be fed in and/or discharged, at least one pyrofuse can be provided between the power controller and the storage block of the energy store in an advantageous further development of the invention. If said storage block comprises at least one capacitor, in particular a double layer capacitor, that is connected to a DC-DC controller, a respective pyrofuse can be provided in an advantageous further development of the invention in each of the connection lines between the DC-DC controller and the capacitor store and can be triggered by said actuating apparatus. The sensor signal used for switching the field effect transistors can in this case advantageously come from a current and/or voltage sensor—and can advantageously be converted in said manner via a flip-flop stage—which current and/or voltage sensor detects the current and/or the voltage between the DC-DC controller and the capacitor store.

Said sensor can, for example, be supplied with an operating voltage to operate the sensor by the actuating apparatus.

BRIEF DESCRIPTION OF THE DRAWINGS

The invention will be explained in more detail in the following with reference to a preferred embodiment and to associated drawings. There are shown in the drawings.

DETAILED DESCRIPTION

Figure 1:
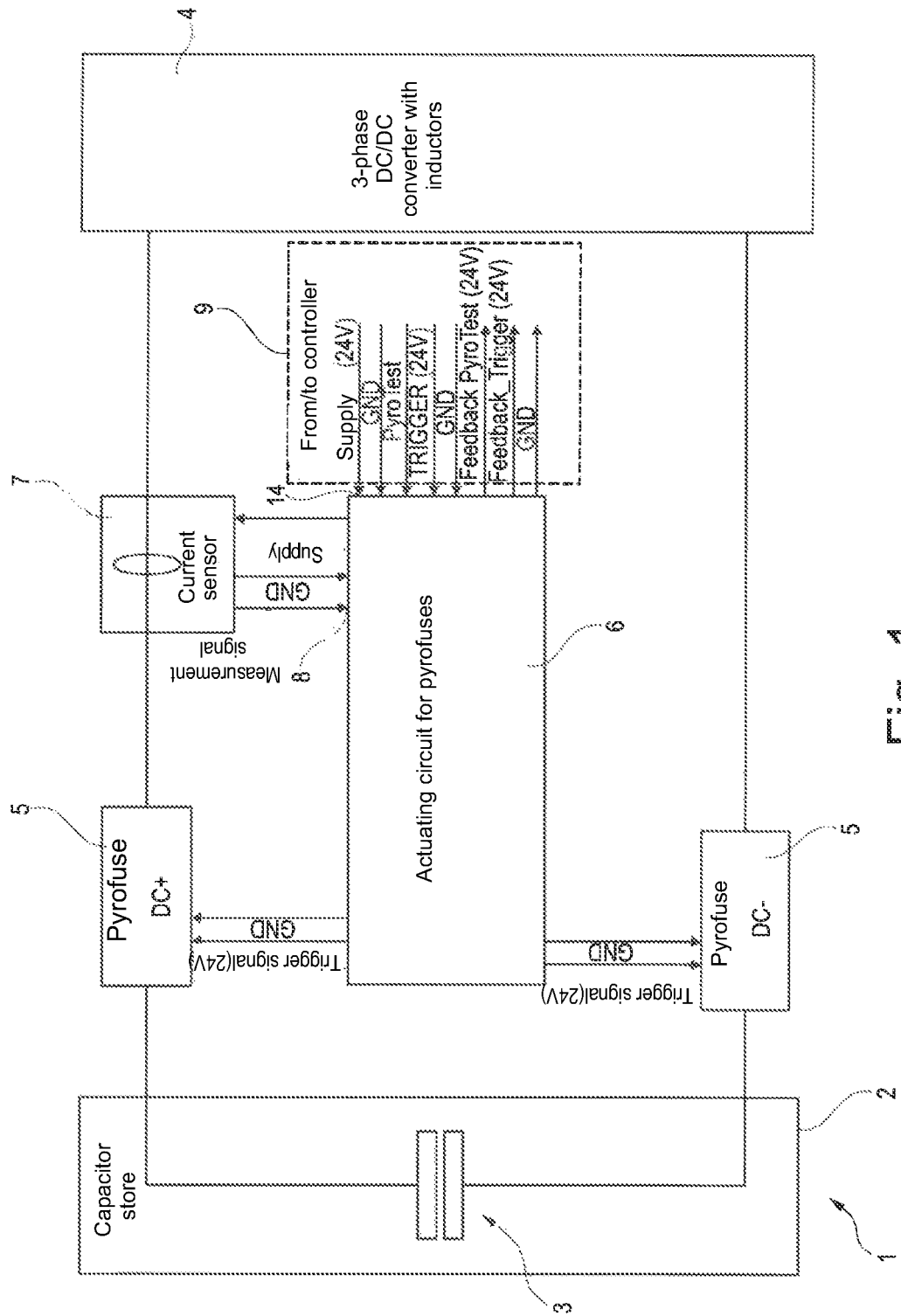
FIG. 1: a schematic representation of an energy storage device having two pyrofuses between its capacitor store and DC-DC controller and having an actuating apparatus for triggering the pyrofuses in accordance with an advantageous embodiment of the invention.

As FIG. 1 shows, the pyrofuse and the actuating apparatus for its triggering can be integrated in an energy storage device 1, in particular installed within a housing of the energy storage device 1 not shown separately. Said energy storage device 1 can here comprise at least one storage block 2 that can have at least one storage cell, preferably in the form of a capacity store, for example in the form of a double layer capacitor. A power controller 4 that can, for example, be connected to said capacity store 3 via two connection lines can be connected to the at least one storage block 2, with said power controller 4 advantageously being able to be a DC-DC controller, in particular a bidirectional DC-DC controller.

The energy storage device 1 can be connected via said power controller 4 to an electric drive device, for example a lifting device, and can supply its electric motor with electrical energy or can store electrical energy produced at the electric motor in crawl operation.

As FIG. 1 shows, at least one pyrofuse 5 can be provided between the at least one storage block 2 and said power controller 4 with the aid of which pyrofuse 5 the storage block 2 can be disconnected from the power controller 4. Such a pyrofuse 5 can in particular be provided in every connection line between the storage block 2 and the power controller 4 to be able to disconnect every connection strand.

The pyrofuses 5 can be triggered by an actuating apparatus 6 that can likewise be integrated in the energy storage device 1, in particular accommodated in its housing. As FIG. 1 shows, said actuating apparatus 6 is here connected to the two pyrofuses 5, on the one hand, to supply them with a triggering current and thus to trigger them. On the other hand, the actuating apparatus 6 can comprise a sensor 7 or can be connected to such a sensor 7 to detect a trigger-relevant state. Said sensor 7 can be a current sensor here that measures a current flow between the storage block 2 and the power controller 4. In accordance with FIG. 1, only one sensor 7 can be provided, with alternatively, however, such a sensor being able to be associated with every connection line between the storage block 2 and the power controller 4.

Said sensor 7 can optionally be supplied with a supply voltage or a supply current by the actuating apparatus 6. The actuating apparatus 6 can have a sensor supply connection for this purpose.

The actuating apparatus 6 can receive a sensor signal of the sensor 7 via a signal input 8 and can evaluate it, as will still be explained.

The actuating apparatus 6 can furthermore be connected to a control apparatus 9 that can be configured to control the energy storage device 1. Such a control apparatus 9 can be formed electronically or can comprise electronic control modules, for example in the form of a microprocessor and of a program memory and can produce control signals for the power controller 4 and/or the storage block 2 or, conversely, to receive operating signals or sensor signals from the storage block 2 and/or from the power controller 4. Said control apparatus 9 can therefore be connected to the storage block 2 and/or to the power controller 4 and can cooperate therewith.

Said actuating apparatus 6 is furthermore connected to the control apparatus 9, which can take place via a control connection 10 of the actuating apparatus 6.

The actuating apparatus 6 can here be formed on one or more circuit boards that can be accommodated in the housing of the energy store. The control apparatus 9 can be integrated in the energy storage device 1, in particular arranged in its housing.

Figure 2:
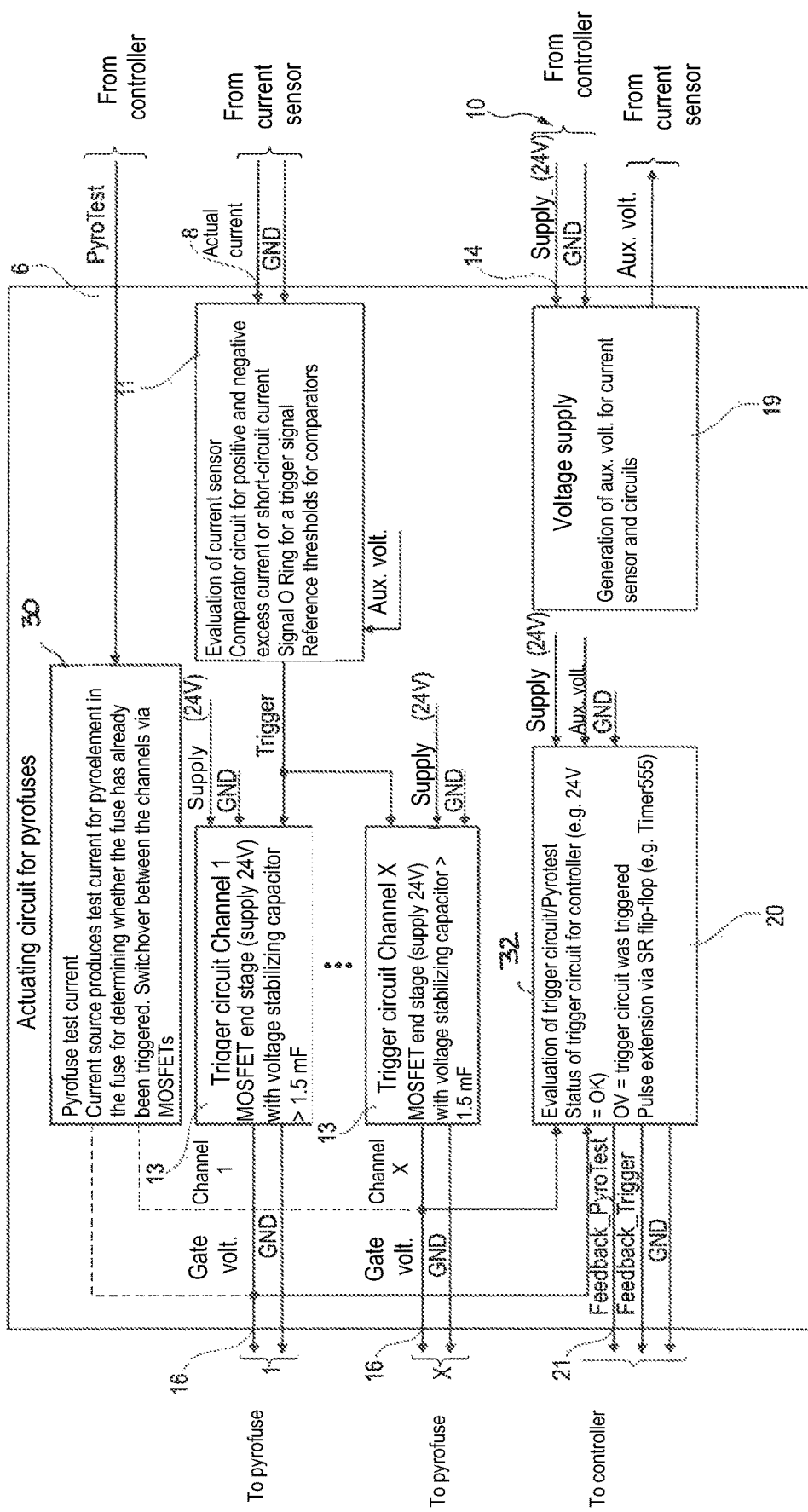
FIG. 2: a schematic representation of the triggering apparatus for triggering the pyrofuses of FIG. 1 that shows the two trigger circuits each having a field effect transistor for triggering the pyrofuses, the evaluation circuit for evaluating the current sensor signal, and the connection to a higher ranking controller.
Figure 3:
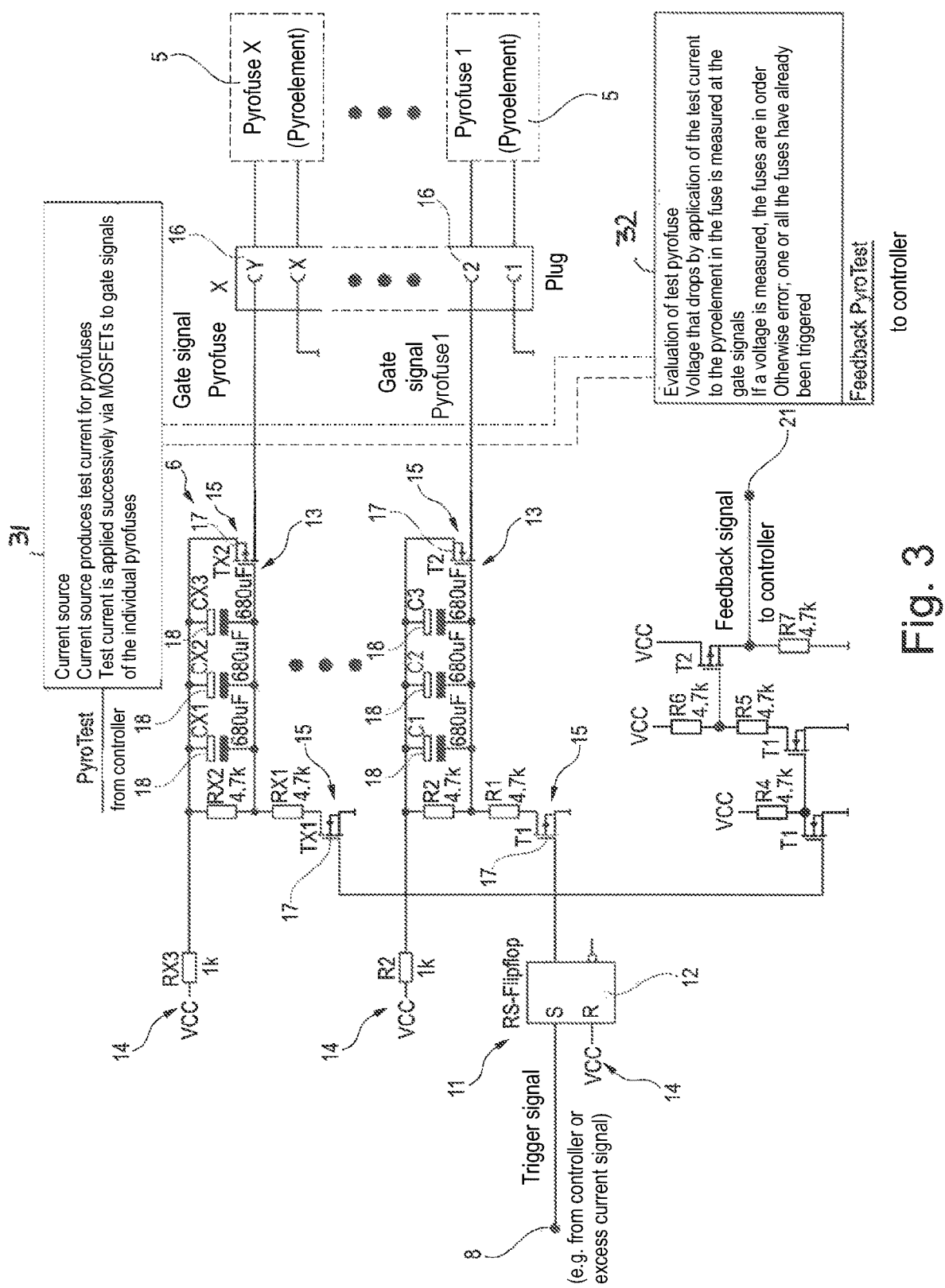
FIG. 3: a representation similar to a block diagram of the actuating circuits for providing the triggering current for the pyrofuses and of the evaluation circuit comprising a flip-flop stage for providing the triggering signal for the actuating circuit.

As FIGS. 2 and 3 show in more detail, the actuation apparatus 6 advantageously comprises an evaluation circuit 11 with whose aid a sensor signal from the sensor 7 and/or also a control signal from the control apparatus 9 can be evaluated. The evaluation circuit 11 can, for example, comprise two comparator or comparison modules to evaluate the sensor signal of the current sensor 7, and indeed once for a positive short circuit current and once for a negative short circuit current that exceeds a threshold or a specific threshold value. Said threshold of the evaluation circuit can here be fixed to a specific current value.

The two comparators can be combined to a common trigger signal at the output side, which trigger signal is advantageously provided to a flip-flop stage 12 of the evaluation circuit 11 to turn even only a very brief sensor pulse into a permanent triggering signal as required. Said flip-flop stage 12 can, for example, comprise a flip-flop element, in particular in the form of an RS flip-flop, with the flip-flop stage 12 being able to be supplied with a supply voltage from a supply connection, cf. FIG. 3.

If there is a triggering signal or if such a triggering signal is provided from a corresponding sensor signal of the sensor 7—or actually from a control signal of the control apparatus 9—by the flip-flop stage 12, the actuating apparatus 6 initiates the triggering of the two pyrofuses 5.

The actuating apparatus 6 comprises two actuating circuits 13 or two actuating channels, "Channel 1" and "Channel x", for the two pyrofuses 5 for this purpose, that each have a supply voltage connection 14 to be acted on by a supply voltage, for example, from the control apparatus 9 or from a different component.

Each of the actuating circuits 13 furthermore comprises a transistor stage 15 for switching the supply voltage via said actuating channels 1 or x through to a respectively provided triggering output 16 to which the respective pyrofuse 5 can be connected and via which the respective pyrofuse 5 can be acted on by the triggering current.

Said transistor stage 5 here advantageously comprises a so-called MOSFET stage, in particular in the form of a P-channel MOSFET 17, with said field effect transistor stage 15 being switchable by the triggering signal that is provided by the evaluation circuit 11. As FIGS. 2 and 3 show, both or all the actuating circuits 13 can be connected to the evaluation circuit 11 and/or can be switched by the same triggering signal to be able to trigger the pyrofuses 5 by a common triggering signal.

Said transistor stages 15 here switch, when they receive the triggering signal, the supply voltage applied to the supply voltage connection 14 through to the triggering output 16 to trigger the pyrofuse 5.

To stabilize the switching of the supply voltage through to the triggering output 16, the actuating circuits 13 can each have at least one voltage stabilizing capacitor 18 that ensures the provision of a sufficient triggering current for the pyrofuse. Each actuating circuit 13 can here advantageously comprise a plurality of such voltage stabilizing capacitors 18 that can advantageously be connected in parallel, cf. FIG. 3.

In order not to put too much strain on the supply voltage by the voltage stabilizing capacitors 18 on the switching on, said voltage stabilizing capacitors 18 can be charged via one or more resistors, cf. FIG. 3.

Each of the voltage stabilizing capacitors 18 can have a capacitance of preferably more than 1.5 mF. The supply voltage at the supply connection 14 can amount to 24 volts, for example.

As FIG. 2 further shows, the actuating device 6 can have a supply module 19 or a supply circuit that can be supplied from the control apparatus 9 and that can correspondingly supply the modules of the actuating apparatus 6 that require a current or a voltage supply. As FIG. 2 shows, the supply module 18 can, for example, supply the sensor 7 and/or the evaluation circuit 11 and/or the evaluation circuits 13 with current or voltage.

The actuating apparatus 6 can advantageously further be configured to report a triggering of the pyrofuses 5 to the connected control apparatus 9. As FIG. 3 shows, a feedback device 20 can provide the triggering signal that is provided by the evaluation circuit 11 or a signal derived therefrom to a feedback connection 21 and/or to the control connection to signal the triggering of the pyrofuses to the control apparatus 9.

As the Figures show, a test stage 30 can be provided to check the triggering state and/or the functional state of the at least one pyrofuse 5. A test signal "Pyrotest" can in particular be provided by the connected control apparatus 9 and/or can be transmitted to the control apparatus 6 in response to which test signal the actuating apparatus 6 can apply a test current to the actuating channels or to the pyrofuses 5. Said test current can, for example, be provided by a current source 31, cf. FIG. 3, with the test stage 30 being able to apply the test current successively to the individual channels or gate signals of the pyrofuses 5.

Said test stage 30 can here comprise an evaluation device 32 that monitors or detects a voltage or a voltage drop at said gate voltage channels. If a voltage drops on the application of the test current due to the internal resistance of the respective pyrofuse element 5, a conclusion can be drawn on a not yet triggered or functioning pyrofuse 5. If, however, no voltage drops, a conclusion can be drawn on an already triggered pyrofuse.

Said evaluation device 32 can, for example, comprise RS flip-flops to detect said voltage or the respective voltage drop. If all the RS flip-flops show a "high level", a conclusion can be drawn on pyrofuses 5 being in order. If, however, one or all of the RS flip-flops show a "low level", a conclusion is drawn that the fuses are no longer in order.

The feedback device 20 can report a feedback signal "Feedback Pyrotest" to the connected control apparatus 9 in dependence on the evaluation of the evaluation circuit 30, cf. FIGS. 2 and 3.

I claim:

1. An actuating device for triggering at least one pyrofuse, the actuating device comprising:
   a supply voltage connection for connection to a supply voltage;

at least one triggering output for connecting the at least one pyrofuse and applying a triggering current to the at least one pyrofuse;

a signal input for receiving a triggering signal that indicates a state requiring the triggering;

at least one actuating circuit connectable to the supply voltage connection for providing the triggering current to the at least one triggering output in dependence on the received triggering signal, wherein the at least one actuating circuit comprises a field effect transistor stage for switching the supply voltage through to the at least one triggering output in dependence on the received triggering signal; and an evaluation circuit for evaluating the received triggering signal that has a flip-flop stage for converting a brief triggering signal pulse into a permanent triggering signal, wherein the flip-flop stage has a flip-flop element, wherein the flip-flop element comprises an RS flip-flop, and wherein the flip-flop element comprises a supply voltage connection for receiving the supply voltage.

2. The actuating device of claim 1, wherein the field effect transistor stage comprises at least one MOSFET element, and wherein the at least one MOSFET element comprises a P-channel MOSFET element.

3. The actuating device of claim 1, wherein the at least one actuating circuit comprises at least one voltage stabilizing capacitor for stabilizing the supply voltage switched through.

4. The actuating device of claim 3, wherein the at least one voltage stabilizing capacitor is chargeable from the supply voltage connection via at least one resistor.

5. The actuating device of claim 4, wherein the at least one actuating circuit comprises a plurality of voltage stabilizing capacitors connected in parallel.

6. The actuating device of claim 3, wherein the at least one actuating circuit comprises a plurality of voltage stabilizing capacitors connected in parallel.

7. The actuating device of claim 1, wherein the evaluation circuit comprises two comparison modules for comparing an input signal with a positive threshold value and a negative threshold value, and wherein the two comparison modules are connected to the flip-flop stage at the output side.

8. The actuating device of claim 1, wherein the at least one pyrofuse comprises a plurality of pyrofuses, and wherein the at least one actuating circuit comprises a plurality of actuating circuits or at least one actuating circuit having a plurality of actuating channels for triggering the plurality of pyrofuses.

9. The actuating device of claim 8, wherein the plurality of actuating circuits or the plurality of actuating channels of the at least one actuating circuit are in parallel with the signal input and are switchable by a common triggering signal.

10. The actuating device of claim 9, wherein the plurality of activating circuits or the plurality of actuating channels of the at least one actuating circuit are on a common circuit board.

11. The actuating device of claim 8, wherein the plurality of activating circuits or the plurality of actuating channels of the at least one actuating circuit are arranged on a common circuit board.

12. The actuating device of claim 1, further comprising a current and/or voltage sensor for providing the triggering signal.

13. The actuating device of claim 1, further comprising a feedback device for providing a feedback signal to a control apparatus, which feedback signal indicates the triggering of the at least one pyrofuse.

14. The actuating device of claim 1, further comprising a test stage to check the triggering state and/or the functional state of the at least one pyrofuse.

15. The actuating device of claim 14, wherein the test stage is configured to apply a test current provided by a current source via at least one actuating channel to the at least one pyrofuse, and wherein the device comprises an evaluation device for detecting or evaluating a voltage drop or a voltage at the at least one actuating channel or the at least one pyrofuse.

16. The actuating device of claim 1, wherein the at least one pyrofuse is between a power controller and a storage block of an energy storage device and for disconnecting the storage block from the power controller.

17. An energy storage device comprising:
at least one storage block and at least one power controller connected to the at least one storage block for feeding current into the at least one storage block and/or for discharging current from the at least one storage block;
at least one pyrofuse between the at least one storage block and the at least one power controller; and
an actuating device for triggering the at least one pyrofuse, wherein the actuating device is configured in accordance with claim 1.

18. The energy storage device of claim 17, wherein the at least one storage block comprises at least one capacitor store, and wherein the at least one power controller is a bidirectional DC-DC controller for feeding current into the at least one storage block and for discharging current from the at least one storage block.

19. The energy storage device of claim 18, further comprising a current and/or voltage sensor for detecting a current and/or a voltage between the at least one power controller and the at least one storage block, wherein a sensor signal of the current and/or voltage sensor is provided to the signal input of the actuating device.

20. The energy storage device of claim 17, further comprising a current and/or voltage sensor for detecting a current and/or a voltage between the at least one power controller and the at least one storage block, wherein a sensor signal of the current and/or voltage sensor is provided to the signal input of the actuating device.

21. An actuating device for triggering a plurality of pyrofuses, the actuating device comprising:
a supply voltage connection for connection to a supply voltage;
a plurality of triggering outputs for connecting the plurality of pyrofuses and applying a triggering current to the plurality of pyrofuses;
a signal input for receiving a triggering signal that indicates a state requiring the triggering; and
a plurality of actuating circuits for triggering the plurality of pyrofuses or at least one actuating circuit having a plurality of actuating channels for triggering the plurality of pyrofuses, wherein the plurality of actuating circuits or the at least one actuating circuit is connectable to the supply voltage connection for providing the triggering current to the plurality of triggering outputs in dependence on the received triggering signal, and wherein each of the plurality of actuating circuits or the at least one actuating circuit comprises a field effect transistor stage for switching the supply voltage through to each triggering output of the plurality of triggering outputs in dependence on the received triggering signal, wherein the plurality of actuating circuits or the plurality of actuating channels of the at least one actuating circuit are in parallel with the signal input and are switchable by a common triggering signal.

22. The actuating device of claim 21, wherein the field effect transistor stage comprises at least one MOSFET element, and wherein the at least one MOSFET element comprises a P-channel MOSFET element.

23. The actuating device of claim 21, wherein the plurality of activating circuits or the plurality of actuating channels of the at least one actuating circuit are on a common circuit board.

* * * * *